United States Patent
Yu et al.

(10) Patent No.: US 10,805,118 B2
(45) Date of Patent: Oct. 13, 2020

(54) SUCCESSIVE JOINT CHANNEL ESTIMATION BASED INTERFERENCE CANCELLATION SCHEME AGAINST COLLIDING INTERFERENCES

(71) Applicant: Intel IP Corporation, Santa Clara, CA (US)

(72) Inventors: Zhibin Yu, Unterhaching (DE); Qing Xu, Unterhaching (DE)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 15/775,161

(22) PCT Filed: Dec. 18, 2015

(86) PCT No.: PCT/US2015/066832
§ 371 (c)(1),
(2) Date: May 10, 2018

(87) PCT Pub. No.: WO2017/105509
PCT Pub. Date: Jun. 22, 2017

(65) Prior Publication Data
US 2018/0375689 A1    Dec. 27, 2018

(51) Int. Cl.
*H04L 25/02* (2006.01)
(52) U.S. Cl.
CPC ...... *H04L 25/0204* (2013.01); *H04L 25/0228* (2013.01); *H04L 25/0244* (2013.01)
(58) Field of Classification Search
CPC ............. H04L 25/0204; H04L 25/0228; H04L 25/0244
See application file for complete search history.

(56) References Cited

U.S. PATENT DOCUMENTS 7,756,007 B2 *   7/2010   Nicoli ................. H04B 7/0417
                                                               370/210
8,521,117 B1     8/2013   Gupta et al.
(Continued)

OTHER PUBLICATIONS

International Search Report dated Sep. 6, 2016 for International Application PCT/US2015/066832.
(Continued)

*Primary Examiner* — Saad A. Waqas
(74) *Attorney, Agent, or Firm* — Eschweiler & Potashnik, LLC

(57) ABSTRACT

A network device generates a successive joint channel estimation based on interference cancellation processes to eliminate or reduce colliding interferences (colliders) at a receiver end. A selection component selects a strongest interference collider from among pseudo noise sequences operating as colliders. A 2 by 2 matrix successive joint channel estimation component performs a successive 2 by 2 matrix joint channel estimation with an initial correlation metric between the strongest interference collider and each remaining interference collider in a first iteration of a set of iterations. A correlation metric component generates an updated correlation metric vector based on the 2 by 2 matrix joint channel estimation. Another 2 by 2 matrix joint channel estimation is then performed with the updated correlation metric vector between a next strongest interference collider and remaining interference colliders of the plurality of interference colliders at a second iteration of the set of iterations.

25 Claims, 7 Drawing Sheets

(56) References Cited

U.S. PATENT DOCUMENTS

| | | | | |
|---|---|---|---|---|
| 9,246,560 B2* | 1/2016 | Sampath | ............... | H04B 7/0417 |
| 2002/0085623 A1* | 7/2002 | Madkour | ............. | H04B 1/7107 |
| | | | | 375/148 |
| 2005/0152485 A1 | 7/2005 | Pukkila et al. | | |
| 2007/0008873 A1 | 1/2007 | Stopler | | |
| 2008/0117997 A1* | 5/2008 | Maltsev | ................. | H04B 7/043 |
| | | | | 375/267 |
| 2010/0046661 A1* | 2/2010 | Yoshida | ............. | H04B 1/71052 |
| | | | | 375/285 |
| 2012/0014465 A1* | 1/2012 | Zhang | ................... | H04L 5/0007 |
| | | | | 375/260 |

OTHER PUBLICATIONS

Nejah, Missaoui et al. "MIMO slotted ALOHA systems with collision resolution and truncated HARQ transmission and combining." Ann. Telecommun. (2016) 71:157-171. 15 pages.

* cited by examiner

SUCCESSIVE JOINT CHANNEL ESTIMATION BASED INTERFERENCE CANCELLATION SCHEME AGAINST COLLIDING INTERFERENCES

This application is a National Phase entry application of International Patent Application No. PCT/US2015/066832 filed Dec. 18, 2015, entitled "A SUCCESSIVE JOINT CHANNEL ESTIMATION BASED INTERFERENCE CANCELLATION SCHEME AGAINST COLLIDING INTERFERENCES" in the name of Zhibin Yu et al. and is hereby incorporated by reference in its entirety.

FIELD

The present disclosure relates to interference cancellation, and more specifically, to successive joint channel estimation based interference scheme against colliding interferences.

BACKGROUND

Interference in cellular networks is one of a number of common problems in radio access networks. Colliding interference cancellation is one type of technique to improve the detection or demodulation performance in a receiver (e.g., an orthogonal frequency-division multiplexing (OFDM) receiver) when the pilots of multiple transmitters are time synchronized at the receiver side, but are also allocated in the same sub-carriers (in other words, the multiple pilots can collide and interfere with each other at the receiver side). Example pilots can be secondary synchronization signals (SSS) used for longer term evolution (LTE) downlink cell identification (ID) detection, side link secondary synchronization signals (SSSS) used for side link ID detection in device to device (D2D) communications, or reference signals (RS) used for LTE downlink reference signal received power (RSRP) measurement and demodulation. SSS, SSSS and RS are all pseudo-noise (PN) sequence based signals. Comparing zadoff-chu sequences, PN sequences can have a much higher cross correlation power, and therefore larger cross-talk interferences from the colliding pilots. As such, there is a need for mitigation or cancellation of the colliding interferences in order to improve the receiver performance.

DETAILED DESCRIPTION

Figure 1:
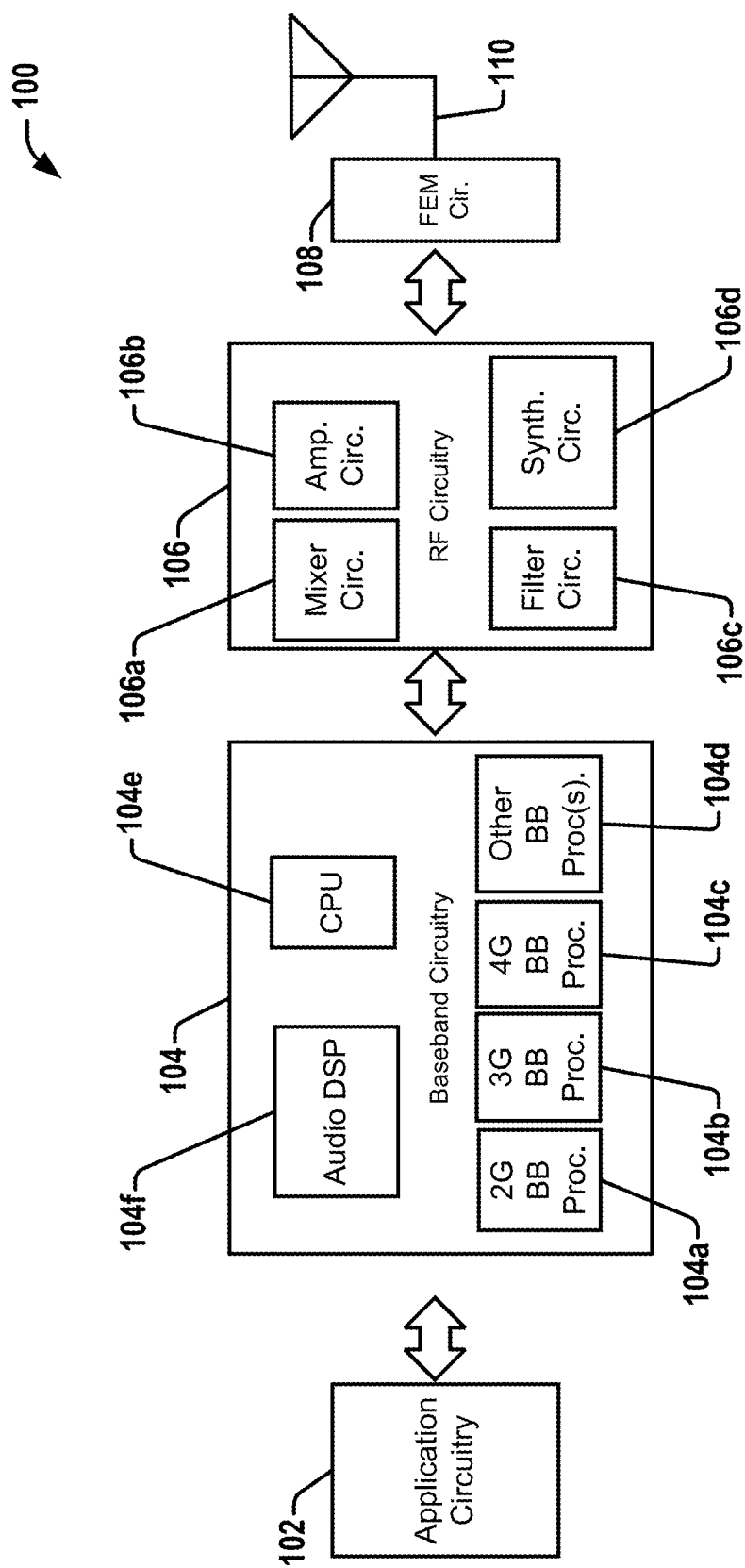
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies, network devices (e.g., macro cells, Access Points (APs), Access Controllers (ACs), eNBs, small cells, UEs, etc.) described herein can operate to enable successive joint channel estimation (S-JCE) processes for reducing or eliminating cross-talk interferences. Components of the network device can facilitate joint channel estimation in a successive way by utilizing various iterations successively. In each iteration, for example, operations of a receiver device can detect or pick up the strongest collider, then perform a 2×2 joint channel estimation between the selected collider with all remaining collider candidates. After each of the iterations, the correlation metric vector can be updated based on the joint channel estimation results to exclude the contribution of the originally selected strongest collider. In a next iteration, the previous selected collider can be removed out of the database and the next strongest collider selected. Additional aspects and details of the disclosure are further described below with reference to figures.

Embodiments described herein may be implemented into a system using any suitably configured hardware or software. FIG. 1 illustrates, for one embodiment, example components of a network device 100, which can also represent a wireless device (e.g., a user equipment (UE)) or other network device (e.g., an eNB, network entity or the like). In some embodiments, the UE device 100 can include application circuitry 102, baseband circuitry 104, radio frequency (RF) circuitry 106, front-end module (FEM) circuitry 108 and one or more antennas 110, coupled together at least as shown.

The application circuitry 102 can include one or more application processors. For example, the application circuitry 102 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the system.

The baseband circuitry 104 can include circuitry such as, but not limited to, one or more single-core or multi-core processors. The baseband circuitry 104 can include one or more baseband processors or control logic to process baseband signals received from a receive signal path of the RF circuitry 106 and to generate baseband signals for a transmit signal path of the RF circuitry 106. Baseband processing circuitry 104 can interface with the application circuitry 102 for generation and processing of the baseband signals and for controlling operations of the RF circuitry 106. For example, in some embodiments, the baseband circuitry 104 can include a second generation (2G) baseband processor 104a, third generation (3G) baseband processor 104b, fourth generation (4G) baseband processor 104c, or other baseband processor(s) 104d for other existing generations, generations in development or to be developed in the future (e.g., fifth generation (5G), 6G, etc.). The baseband circuitry 104 (e.g., one or more of baseband processors 104a-d) can handle various radio control functions that enable communication with one or more radio networks via the RF circuitry 106. The radio control functions can include, but are not limited to, signal modulation/demodulation, encoding/decoding, radio frequency shifting, etc. In some embodiments, modulation/demodulation circuitry of the baseband circuitry 104 can include Fast-Fourier Transform (FFT), precoding, or constellation mapping/demapping functionality. In some embodiments, encoding/decoding circuitry of the baseband circuitry 104 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 104 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 104e of the baseband circuitry 104 can be configured to run elements of the protocol stack for signaling of the PHY, MAC, RLC, PDCP or RRC layers. In some embodiments, the baseband circuitry can include one or more audio digital signal processor(s) (DSP) 104f. The audio DSP(s) 104f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 104 and the application circuitry 102 can be implemented together such as, for example, on a system on a chip (SOC).

In some embodiments, the baseband circuitry 104 can provide for communication compatible with one or more radio technologies. For example, in some embodiments, the baseband circuitry 104 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 104 is configured to support radio communications of more than one wireless protocol can be referred to as multi-mode baseband circuitry.

RF circuitry 106 can enable communication with wireless networks using modulated electromagnetic radiation through a non-solid medium. In various embodiments, the RF circuitry 106 can include switches, filters, amplifiers, etc. to facilitate the communication with the wireless network. RF circuitry 106 can include a receive signal path which can include circuitry to down-convert RF signals received from the FEM circuitry 108 and provide baseband signals to the baseband circuitry 104. RF circuitry 106 can also include a transmit signal path, which can include circuitry to up-convert baseband signals provided by the baseband circuitry 104 and provide RF output signals to the FEM circuitry 108 for transmission.

In some embodiments, the RF circuitry 106 can include a receive signal path and a transmit signal path. The receive signal path of the RF circuitry 106 can include mixer circuitry 106a, amplifier circuitry 106b and filter circuitry 106c. The transmit signal path of the RF circuitry 106 can include filter circuitry 106c and mixer circuitry 106a. RF circuitry 106 can also include synthesizer circuitry 106d for synthesizing a frequency for use by the mixer circuitry 106a of the receive signal path and the transmit signal path. In some embodiments, the mixer circuitry 106a of the receive signal path can be configured to down-convert RF signals received from the FEM circuitry 108 based on the synthesized frequency provided by synthesizer circuitry 106d. The amplifier circuitry 106b can be configured to amplify the down-converted signals and the filter circuitry 106c can be a low-pass filter (LPF) or band-pass filter (BPF) configured to remove unwanted signals from the down-converted signals to generate output baseband signals. Output baseband signals can be provided to the baseband circuitry 104 for further processing. In some embodiments, the output baseband signals can be zero-frequency baseband signals, although this is not a requirement. In some embodiments, mixer circuitry 106a of the receive signal path can comprise passive mixers, although the scope of the embodiments is not limited in this respect.

In some embodiments, the mixer circuitry 106a of the transmit signal path can be configured to up-convert input baseband signals based on the synthesized frequency provided by the synthesizer circuitry 106d to generate RF output signals for the FEM circuitry 108. The baseband signals can be provided by the baseband circuitry 104 and can be filtered by filter circuitry 106c. The filter circuitry 106c can include a low-pass filter (LPF), although the scope of the embodiments is not limited in this respect.

In some embodiments, the mixer circuitry 106a of the receive signal path and the mixer circuitry 106a of the transmit signal path can include two or more mixers and can be arranged for quadrature downconversion or upconversion respectively. In some embodiments, the mixer circuitry 106a of the receive signal path and the mixer circuitry 106a of the transmit signal path can include two or more mixers and can be arranged for image rejection (e.g., Hartley image rejection). In some embodiments, the mixer circuitry 106a of the receive signal path and the mixer circuitry 106a can be arranged for direct downconversion or direct upconversion, respectively. In some embodiments, the mixer circuitry 106a of the receive signal path and the mixer circuitry 106a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 106 can include analog-to-digital converter (ADC) and digital-to-analog converter (DAC) circuitry and the baseband circuitry 104 can include a digital baseband interface to communicate with the RF circuitry 106.

In some dual-mode embodiments, a separate radio IC circuitry can be provided for processing signals for each spectrum, although the scope of the embodiments is not limited in this respect.

In some embodiments, the synthesizer circuitry 106d can be a fractional-N synthesizer or a fractional N/N+1 synthesizer, although the scope of the embodiments is not limited in this respect as other types of frequency synthesizers can be suitable. For example, synthesizer circuitry 106d can be a delta-sigma synthesizer, a frequency multiplier, or a synthesizer comprising a phase-locked loop with a frequency divider.

The synthesizer circuitry 106d can be configured to synthesize an output frequency for use by the mixer circuitry 106a of the RF circuitry 106 based on a frequency input and a divider control input. In some embodiments, the synthesizer circuitry 106d can be a fractional N/N+1 synthesizer.

In some embodiments, frequency input can be provided by a voltage controlled oscillator (VCO), although that is not a requirement. Divider control input can be provided by either the baseband circuitry 104 or the applications processor 102 depending on the desired output frequency. In some embodiments, a divider control input (e.g., N) can be determined from a look-up table based on a channel indicated by the applications processor 102.

Synthesizer circuitry 106d of the RF circuitry 106 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 106 can include an IQ/polar converter.

FEM circuitry 108 can include a receive signal path which can include circuitry configured to operate on RF signals received from one or more antennas 110, amplify the received signals and provide the amplified versions of the received signals to the RF circuitry 106 for further processing. FEM circuitry 108 can also include a transmit signal path which can include circuitry configured to amplify signals for transmission provided by the RF circuitry 106 for transmission by one or more of the one or more antennas 110.

In some embodiments, the FEM circuitry 108 can include a TX/RX switch to switch between transmit mode and receive mode operation. The FEM circuitry 108 can include a receive signal path and a transmit signal path. The receive signal path of the FEM circuitry can include a low-noise amplifier (LNA) to amplify received RF signals and provide the amplified received RF signals as an output (e.g., to the RF circuitry 106). The transmit signal path of the FEM circuitry 108 can include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 can include additional elements such as, for example, memory/storage, display, camera, sensor, or input/output (I/O) interface.

In accordance with various embodiments described herein, techniques can be employed to facilitate successive joint channel estimation based interference cancelling against colliding interferences or colliders. In embodiments herein, network devices such as the UE 100, eNB or other network device can generate colliding interference cancellation with or without priori-knowledge of colliders at the FEM circuitry 108 or receiving chain. For example, colliding interference cancellation without priori-knowledge of colliders can operate during an initial detection phase of a receiver (e.g., an OFDM receiver). Examples of the colliders being detected can comprise SSS based cell ID detection for LTE downlink and SSSS based side link detection for D2D. For this kind of application, the detection processes in a detection phase can detect colliders without interference cancellation and can detect when a stronger collider is interfered by weaker colliders, as well as identify those stronger colliders or stronger signals colliding or interfering with a serving band or selected receiving signal. In the a-priori processes it can be important to cancel the stronger colliders from the weaker collider, and not necessarily the other way around.

In other embodiments, network devices such as a UE 100, eNB or other network entity with receiver circuitry can also generate colliding interference cancellation with priori-knowledge of colliders at the FEM circuitry 108 or receiving chain. The priori knowledge interference cancellation processes can primarily take place in the demodulation phase, before which the collider information has already been obtained by a detection phase. Example processes utilized can be RS based channel estimation and equalization. For this kind of application, the primary interest is to cancel the interferences out of only one collider (for example the serving cell). But it is important to cancel all kind of colliders out of it, regardless they are weaker or stronger, in order to achieve the maximal throughput performance.

Figure 2:
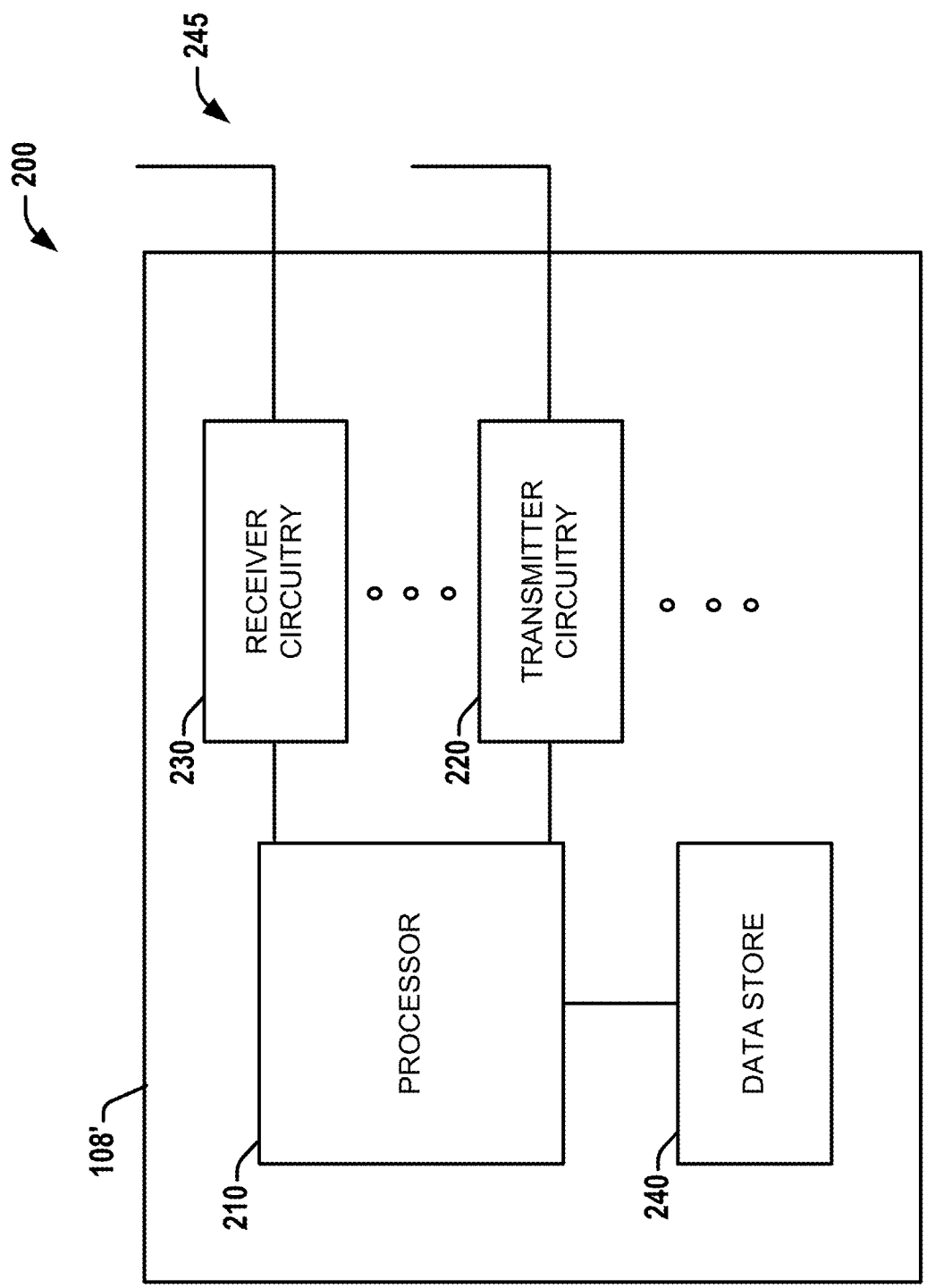
FIG. 2 is a block diagram of a system employable in an enhanced/evolved node B (eNB), other base station, or UE that facilitates successive 2×2 joint channel estimation for collider interference according to various aspects described herein.

Referring to FIG. 2, illustrated is an example of a wireless communication system or device 100 in accordance with various aspects being described. The wireless communication device 100 can be a transceiver or a receiver device (e.g., an OFDM receiver or the other receiver) that is included with the FEM circuitry 108' or can be external thereto. The FEM circuitry 108', for example, can comprise a processor 210 communicatively coupled to data store 240 (e.g., a memory or memory array), a receiver circuitry/component 230, and a transmitter circuitry/component 220. The data store 240 can include instructions that can be implemented by processor 210, transmitter circuitry 220, or receiver circuitry 230 to implement various aspects described herein.

The receiver circuitry 230 and the transmitter circuitry 220 can each comprise one or more receiver chains, or one or more transmitter chains, respectively that can operate to process one or more signals for demodulation or modulation. Each can comprise an number of components comprising one or more filters, analog digital converters, digital to analog converters, amplifiers, antennas or other signal processing components (not shown). The receiver circuitry 230 can operate to receive various signals that can interfere or collide with a signal of interest (e.g., a serving cell carrier or band).

Colliding Interference cancellation can improve the detection or demodulation performance in an OFDM receiver when the pilots of multiple transmitters are time synchronized at the receiver side, but are also allocated in the same sub-carriers (in other words, the multiple pilots of different cells, for example, are colliding and interfering with each other at the receiver side). As state above, example pilot signals can be secondary synchronization signals (SSS) that are used for LTE downlink cell ID detection, side link secondary synchronization signals (SSSS) that are used for side link ID detection in device to device (D2D) communications, or reference signals (RS) that are used are for LTE downlink RSRP measurement and demodulation. SSS, SSSS and RS are all pseudo-noise (PN) sequence based signals. Comparing zadoff-chu sequences, PN sequences can have much higher cross correlation power, and therefore much bigger cross-talk interferences from the colliding pilots, and so performing mitigation or cancellation operations of the colliding interferences can be useful to improve the receiver performance.

In one embodiment, the receiver circuitry 230 can operate to perform a successive joint channel estimation that cancels interference of colliders at the receiver without prior knowledge related to the colliders. As such, the receiver circuitry 230 can operate, for example in different phases of processors that can include a detection phase and a demodulation phase. The detection phase can have no prior knowledge of the colliders (e.g., the interfering signals form pilots or channel signals of surrounding cells), while the phase demodulation phase can presuppose that the colliders, which can be weaker and stronger, are already known and identified in order to perform interference cancellation as well as improve the quality of service (QoS) or set of signal properties, for example.

Different processes for a successive joint channel estimation can be utilized depending on whether or not collider information (e.g., the number of actual colliders and collider cell IDs) is known beforehand or dynamically ascertained. If the collider information is not known the successive join channel estimation can operate in the scenario when the receiver circuitry detects the collider information, such as, for example, in LTE cell search or otherwise. In the a-priori operations where the detection phase is utilized to determine collider information, the processes can detect a strongest collider at each iteration, and then perform a similar 2 by 2 successive join channel estimation that pairs the detected strongest collider with each of the remaining colliders.

In one example, at the detection phase of operation, the receiver circuitry 230 can generate a collider candidate set (e.g., a collider candidate data set/base), which can be formed in the data store 240. The collider candidate set can include potential colliders that can be detected based on any kind of detection algorithm (set of processes) that is without interference cancellation and used when a stronger collider is interfered by a weaker collider. For example, detection processes can include SSS based cell ID detection for LTE downlink, SSS based side link detection for D2D can be utilized, or other collider detection operations. When the detection phase is utilized before demodulation processes the strongest collider can be identified or any collider from among a number of colliders in order to eliminate the stronger one from the weaker, rather than the other way around or opposite case. With priori processes, this can differ because the colliders are not all potential colliders that may or may not exists, but are known.

As such, the phase detection can further include the receiver circuitry 230 generating a collider candidate set of candidate colliders based on a detection of one or more pseudo-noise (PN) sequences at one or more receiver inputs 245. Then, the phase detection can continue with the generation of a correlation metric that can be generated as a vector (or a correlation metric vector). This correlation metric vector can be formed by correlating input sequences (e.g., signal sequences) the inputs 245 with descrambling sequence candidates from descrambling operations of the potential/candidate colliders.

The process can then continue with selecting a candidate collider (e.g., any collider or a strongest ranked collider) from the collider candidate set. This selected candidate collider can then be analyzed to determine whether the candidate collider satisfies a predetermined quality threshold. If it does not satisfy a threshold, then the cancellation operations can stop or cease. If it does satisfy the threshold, then the candidate collider can be determined as a potential interferer that is stronger than others and processed similarly, but not exactly, as the processes being described for priori knowledge of colliders in the demodulation phase of receive signal processing.

For example, at a plurality of iterations, a 2 by 2 matrix joint channel estimation with the candidate collider and other interference colliders of the collider candidate set can be performed based on the correlation metric vector. These processes can comprise different subsets of iterations within each iteration in order to perform the 2×2 interference estimation over joint channels of a carrier or band with each collider candidate. For example, a 2×2 joint channel estimation is applied with each remaining collider candidate with respect to the detected strongest or selected collider. This can be done with correlation metric vector initially, which is updated in subsequent iterations as the intermediate channel transfer function of each remaining collider has been computed. As such, the correlation metric vector for each remaining collider (after the removal of the effect or contribution of the selected/strongest collider) is replaced by the computed intermediate channel transfer function on each sub-carrier block/sub-band or each sub-carrier group, in which a block can be one or more sub-carriers or one or more sub-bands of an entire carrier or band, for example. The current detected strongest/selected collider is reported and then removed from the CCD. In a next step, an iteration index is increased, and if the iteration number is exceeding a pre-defined maximal number of iterations, the iterations stop.

In another embodiment, the receiver circuitry 230 can operate with prior knowledge of the colliders or interference signals colliding with a desired signal or channel. In this case, the primary objective can be to cancel interferences out of only one collider (e.g., a serving cell or band), rather than all detected surrounding cells. In this mode of operation (e.g., priori mode), the receiver circuitry 230 can cancel all colliders within the particular cell, regardless if any one satisfies a particular quality threshold or not, or the signals are weaker or stronger than the particular fixed collider or serving cell of interest. This ensures a maximum throughput performance for the fixed collider.

Figure 3:
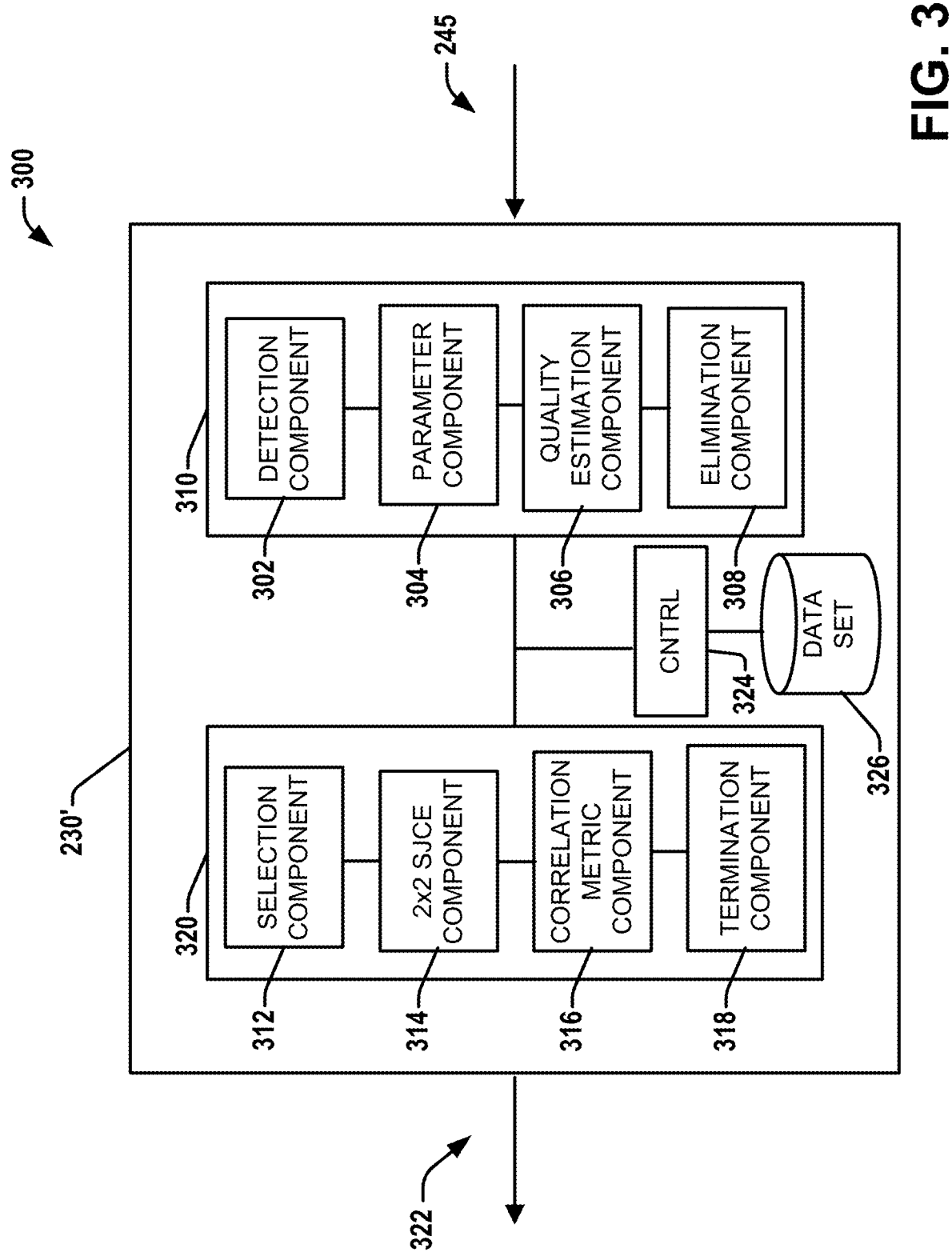
FIG. 3 illustrates another block diagram of a receiver of a system employable in an eNB, other base station, or UE that facilitates successive 2×2 joint channel estimation for collider interference according to various aspects described herein.

Referring to FIG. 3, illustrated is another example of receiver circuitry 230' in accordance with various embodiments being described. The receiver circuitry 230' operates to perform a successive joint channel estimation that cancels interference of colliders at a receiver (e.g., an OFDM receiver, CDMA receiver, or the like) with or without prior knowledge of the colliders at the data set/data storage 326.

The receiver circuitry 230' comprises a detection phase component 310 and a demodulation phase component 320. Both components can be communicatively coupled to one another and integrated as part of the receiver circuitry 230' along one or more receiver processing chains 322 receiving pilot signals at receiver input(s) 245 on a frequency band (e.g., on an LTE serving cell). In order to increase the signal quality suitable for efficient downlink among multiple receivers and receiving signals that are time synchronized, the interference signals (colliders) at each sample position can be canceled. As such, cancellation operations can be done at sections (sub-bands) of the frequency band being utilized for operation of a particular receiver (e.g., the receive circuitry 230').

The detection phase component 310 can operate to facilitate detection operations in cases where the receiver circuitry 230' has no prior knowledge of the pilot signals interfering at any given sub-band. The detection phase component 310, for example, comprises a detection component 302, a parameter component 304, a quality estimation component 306 and an elimination component 308. Each component is communicatively coupled to one another, one or more processors or controllers 324, the data set 326, and the demodulation phase component 320.

The demodulation phase component 320 operates to generate portions of the successive joint channel estimation that utilizes known qualities or parameters of the pilot signals and interfering colliders, which can be any signal at a signal whether it is orthogonal or not to any other signal at the sub-band. The frequency band of interest can be analyzed and cancelled along multiple sub-bands comprising an entire or full frequency band. The demodulation phase component 320 can be used to demodulate received signals as well as preform one or more interference cancellation processes discussed in detail in various embodiments or aspects herein. The demodulation phase component 320 further includes a selection component 312, a 2×2 successive join channel estimation (S-JCE) component 314, a correlation metric component 316, and a termination component 318, which are also communicatively coupled to one another along the receiver chain 322, the controller(s) 324, the data set 326, and the detection phase component 310.

Together the detection phase component 310 and the demodulation phase component 320 operate to generate various successive joint channel estimation processes. Successive interference cancellation processes, for example, can operate to cancel colliding interferences in a successive manner such as by utilizing iterations. In each SIC iteration, the strongest collider can be determined as the aggressor while assuming that remaining colliders are victims. This approach can perform channel estimation only on the aggressor while assuming that the victim cells are whitened noise. A reconstruction of the aggressor signals can then be done using channel transfer functions that are estimated. A channel transfer function as used herein can refer to a fading profile of a collider signal in the frequency domain or in the time domain, for example. For CDMA, the channel transfer function can be a channel impulse response (CIR) because the 2*2 matrix joint channel estimation and cancellation for CDMA for CDMA could be done in time domain, while for OFDM in frequency domain. The major difference between time domain and frequency domain is that: in time domain the channel fading profile can be the Channel Impulse Response (CIR) which correlates the pilots from receiver point of view. But in frequency domain, the channel fading profile is Channel Transfer Function (CTF) which multiplies the pilots from the receiver point of view.

The successive interference cancellation processes can then further operate to cancel the reconstructed interference by subtracting the received signal with the reconstructed interference. After cancellation, a remaining strongest collider can be selected again and the process repeats in the next iteration. However, residual channel estimate errors of the aggressor channel estimation can remain, and thus leak into the victims as remaining interferences.

Colliding interferences can also be canceled in a joint manner such as by utilizing parallel joint channel estimation based techniques that take into account parallel channel signals that are alongside/adjacent to one another or in close proximity. However, computation complexity can be increased as the matrices utilized in the equation can be very large and limited in number.

The detection phase component 310 and the demodulation phase component 320 facilitate the successive joint channel estimation processes for interference cancellation. The detection component 302 can generate a collider candidate set of candidate colliders based on a detection of noise sequences (e.g., pseudo-noise (PN) sequences) at one or more receiver inputs 245. For this kind of application, a detection algorithm or processes without interference cancellation can be utilized for when a stronger collider is interfered with by weaker colliders. The detection component 302 can generate a detection that includes an LTE downlink cell ID detection that detects SSS, for example. Alternatively or additionally, a side link ID detection can be implemented to detect SSSS in a D2D communication, or RS can be detected that are signals associated with a LTE downlink reference signal received power (RSRP) measurement or demodulation operations.

For an OFDM receiver, for example, the detection can occur for a sub-carrier of a carrier frequency. In OFDM, one sub-carrier can correspond to one sample position in the frequency domain. A pilot (SSS, RS, etc.) can occupy multiple sample positions (i.e. multiple sub-carriers), and can be continuous or non-continuous in the frequency domain to be a sample sequence. As such, a collider can also refer to a pilot that is time and frequency colliding with another pilot, and thus both of them are occupying the same sample positions, so the two sequences are colliding. A full frequency band can cover the length of full sequences, i.e., all sub-carriers. A sub-band covers only a block of subsequent sub-carriers or bandwidth portions of an entire carrier or band, which can be the minimal unit that a 2*2 matrix joint channel estimation is performed as described herein with additional components.

The parameter component 304 can determine one or more parameters of the input samples 245 from pilot signals on a same sub-band, for example. The parameters can comprise an iteration index number, a collider candidate dataset with potential colliders, an initial correlation metric vector, and other parameters or properties related to colliders or candidate colliders. The correlation metric vector can comprise a function that correlates the input samples 245 with one or more descrambling sequence candidates, which, in one example, can comprise PN sequences.

The term descrambling sequence candidate can derive from utilizing scrambled sequences or encryption codes based on a scrambling seed or key, in which different seeds can generate different sequences. A descrambling sequence can be a template by which the receiver circuitry 230' correlates with the received sequence to remove the scrambling code. The scrambling sequences can be a local sequence and each scrambling code can have a different template by which it can be descrambled. A template refers to a sequence, in which after descrambling the result can be a sequence containing the information. Scrambling can be performed by utilizing a conjugate or a multiple of the scrambled sequence on the receiver side, in which the conjugate or multiple with a stem conjugate sequence operates to remove the scrambling code. The term candidate means that a potential collider or interference signal may be present or not, and thus, a larger number of candidates can be obtained or derived than a number of colliders actually present at the receiver circuitry 230', for example. When the collider information has been detected or ascertained already, it is no longer a candidate and can be an actual collider with its own template.

The computation of a correlation metric by the parameter component 304 can be generated by forming a vector between a local template conjugate and a received signal on a sub-carrier or a sub-band, for example, as a portion of an entire frequency carrier or band. The received sequence can include all interferences on the sub-carrier/band, for example. This initial correlation metric vector can be updated in subsequent operations by the correlation metric component 316.

The quality estimation component 306 can operate to perform a quality estimation to determine whether the potential collider satisfies a predetermined threshold. A potential collider, for example, can be any candidate from the candidate data base that was generated via the detection component 302, or be selected as a strongest collider to be processed by the first iteration of the self-interference cancellation where priori knowledge has ascertained actual colliders from potential colliders, for example. The strongest collider can be based on a rank with respect to any property related to the colliders, such as amplitude, a signal to noise ratio, or the other signal values.

The elimination component 308 can remove the potential collider from the data store in situations where it is not strong enough to warrant further consideration, remove a contribution of the potential collider from the colliders known after a completion of one or more iterations of the set of iterations, such as by an inverse cancellation or other function related to a determined result of the collider function contributing to the interference of the carrier or band. Afterwards, iterations can continue without consideration or inclusion of the strongest collider until the iterations are terminated by the termination component 318, for example.

The selection component 312 selects a first collider of a plurality of colliders for the first iteration of successive joint channel estimation processing. The selection can be a potential collider from potential colliders in a collider candidate set 326 based on a ranking of the plurality of potential colliders. The selection can be some other determination according to strength, other functional relationship, or randomly performed.

The 2 by 2 (2×2) matrix joint channel estimation component configured to perform, in a first subset of iterations, a successive 2×2 matrix joint channel estimation (S-JCE) with the initial correlation metric vector between a first collider and the other colliders detected at a sub-band or position along a frequency band or carrier as part of a first iteration of a set/plurality of iterations. The first iteration of the S-JCE can operate as a sub-set of iterations, in which each collider of a plurality of colliders can be correlated in the S-JCE at a particular sub-band. For example, the first sub-set iteration of the first iteration can comprise the successive 2×2 matrix joint channel estimation (S-JCE) with the initial correlation metric vector between the first collider and another collider. The second sub-set iteration of the first iteration can comprise another successive 2×2 matrix joint channel estimation (S-JCE) with the initial correlation metric vector between the first collider and different other collider of remaining colliders. The sub-sets can continue until the selected collider (e.g., strongest collider or next strongest colliders) are processed accordingly with all colliders in a 2×2 successive matrix with the initial correlation metric vector and the first collider.

The correlation metric component 316 can generate an updated correlation metric vector based on the 2 by 2 matrix joint channel estimation at the first iteration by excluding a contribution of the first collider from the plurality of colliders that was correlated with the remaining colliders with the initial correlation metric component. As such, an updated correlation metric vector can be generated between iterations, such as after the first iteration and all sub-set iterations therein, for example.

The updated correlation metric vector generated by the correlation metric component 316 can be a function of the result of the 2 by 2 matrix joint channel estimation in the previous iteration. The updated correlation metric vector can be generated, for example, by a channel transfer function of an indexed collider of the N colliders (wherein N is an integer greater than two) with at least one other channel transfer function of the remaining colliders of the plurality of N colliders that have been descrambled by a local descrambling sequence.

The 2 by 2 matrix joint channel estimation component 314 can further perform, in a second subset of iterations, another 2 by 2 matrix joint channel estimation with the updated correlation metric vector between a second selected collider and remaining colliders of the plurality of colliders after the first collider utilized in the first or previous iteration has been removed (e.g., via the elimination component 308), respectively, at a second iteration of the set of iterations. As such, the contribution of the first collider can be removed, and then another collider can be selected via the selection component 312. Then at the second iteration the 2 by 2 matrix joint channel estimation component 314 can further perform the second subset of iterations. The first sub-set iteration of the second iteration can comprise the successive 2×2 matrix joint channel estimation (S-JCE) with the updated correlation metric vector between the second selected collider and remaining colliders of the set (candidate set or actual set of colliders), the collider candidate set comprising more than two candidate/colliders. The second sub-set iteration of the second iteration can comprise another successive 2×2 matrix joint channel estimation (S-JCE) with the updated correlation metric vector between the first collider and a different other remaining collider of remaining colliders. The sub-sets can continue until all colliders have been operated on with the updated correlation metric vector and the second selected collider, thereby ending the second iteration.

The updated correlation metric vector can be updated again if the iterations are not terminated by the termination component 318. The updated correlation metric vectors can also be referred to as an intermediate correlation metric vector. The correlation metric component 316 generates the updated correlation metric vector based on the 2 by 2 matrix joint channel estimation by generating an intermediate channel transfer function between each of the iterations. This operation can comprise utilizing another configured channel transfer function of another indexed collider and another different channel transfer function that corresponds to each the remaining colliders of the remaining colliders that have been descrambled by a local descrambling sequence. The channel transfer functions can be updated at each updating of the correlation metric vector in order to correspond to each remaining collider and be different from one another, as occurring at each of the iterations without the contribution of the previously selected collider. As used herein the channel transfer function can refer to the fading profile of a collider in the frequency domain.

Each 2 by 2 (2×2) S-JCE process can operate thus is to solve the channel transfer function within a sub-band (for example one resource block for LTE) out of a complete frequency band. The length of the sub-band can stay within an assumed maximal coherent bandwidth. To solve a complete frequency band for one collider pair, several sub-bands can be processed according to the above operations. The 2×2 matrix joint channel estimation of different sub-bands is not correlated with each other.

The termination component 318 can terminate the plurality of iterations, based on a predefined number of iterations, or, in response to a quality estimation of a strongest collider of the plurality of colliders satisfying the predetermined quality threshold. In one embodiment, for evaluating the quality or strength of the strongest collider (e.g., via the quality estimation component), for example, the channel transfer function of different sub-bands for one collider can be combined (either non-coherently combining, i.e. only the amplitudes averaging; or coherently combining, i.e. averaging of phases and amplitudes).

The components can continue operating to perform corresponding operations for sets of iterations at each sub-band along a frequency band or at each sub-carrier along an entire frequency carrier, for example. The results can then be used to eliminate all interference colliders along a band or carrier via the receiver circuitry 230'.

The S-JCE processes of the receiver circuitry 230' can achieve much better interference cancellation performance because no self-cancellation of victims results and there is no residual channel estimation errors from the aggressors because the joint channel estimation in each iteration removes the cross-talk interference coming from a selected collider completely. These S-JCE process further involve much lower complexity when a number of colliders is more than 2 because all joint channel estimation is done by 2×2 matrices regardless of how many colliders are present, potentially or actually. Further, the operations for S-JCDE can work without prior knowledge of colliders: the operations do not need to know the exact number of colliders or their identities beforehand because that can be detected automatically and dynamically during the successive iterations. Furthermore, it is possible to have a scalable design to have the tradeoff between computation complexity and the cancellation performance by controlling the number of iterations.

The mathematical representation of the components and operations of S-JCE are further described below. In iteration M, a strongest collider can be selected among remaining colliders, indexed as $p_M$. The following 2×2 joint channel estimation equation can be made for each colliding pair between each remaining collider i with $p_M$:

$$\begin{bmatrix} h_{k,p_M}^M \\ h_{k,i}^M \end{bmatrix}_{2\times 1} = \begin{bmatrix} 1 & \frac{1}{L}\sum_j s_{k,p_M}^*(j)s_{k,i}(j) \\ \frac{1}{L}\sum_j s_{k,i}^*(j)s_{k,p_M}(j) & 1 \end{bmatrix}_{2\times 2}^{-1} X \begin{bmatrix} y_{k,p_M}^M \\ y_{k,i}^M \end{bmatrix}_{2\times 1} ; \qquad \text{eqn. 1}$$

wherein * denotes a conjugate operation; $s_{k,i}$ is the local template of PN sequences for collider i (for example i can be physical cell ID for LTE) on sub-carrier block I sub-band block k, in which a sub-carrier block (or sub-band block) can be a set of subsequent reference sub-carriers within one OFDM symbol (e.g., a resource block in LTE or even narrower band). The block length can be defined by L. The values of L can be selected to ensure that the cross-correlation matrix (eqn. 1) is non-singular. The L value can depend on the scrambling sequences and the modulation scheme. The minimal value of L can be one, if the modulation scheme is not binary phase shift keying (BPSK) and different scrambling sequences have all different elements on each reference carriers, for example. The maximal value of L can be the maximal coherence bandwidth, and thus it is assumed that $h_{k,i}$ can be an averaged channel transfer function of collider ion sub-carrier block or sub-band block k, for example; $y_{k,i}$ can be named as the correlation metric vector, which is the received signal on sub-carrier block or sub-band block k, and then further descrambled by local template $s_{k,i}$, and computed as the following:

$$y_{k,i} = \frac{1}{L} \sum_j z_k(j) \cdot s_{k,i}^*(j); \quad \text{eqn. 2}$$

wherein $z_k$ is a received sequence including all interferences on sub-carrier block or sub-band block k;

wherein the correlation vector y is initialized based on eqn. 2; (note: the cross correlation matrix can be invertible because $$1 \neq \frac{1}{L} \sum_j s_{k,p_M}^*(j) s_{k,i}(j)$$

due to cross-correlation of two different scramble sequences); wherein $h_{k,i}^M$ is not the real transfer function I, bu re-interpreted in the 2×2 S-JCE as an intermediate channel transfer function (or virtual transfer function) i at sub-carrier block or sub-band block k, which is the channel transfer function of collider i plus the channel transfer function of other remaining colliders j (j≠$p_M$) descrambled by local PN template of $s_{k,i}$ but excluding cross-talk interferences of collier $p_M$ (in other words, including the remaining the cross-talk interference, except for collider $p_M$).

Then a 2×2 joint channel estimation can be applied for each pair of the selected collider with each of the remaining colliders on each sub-carrier block or sub-band block k, so that the cross-talk interference generated by the collider $p_M$ for each of the remaining colliders are cancelled.

In the next iteration M+1, $p_M$ (the indexed strongest collider) can be removed from the candidate list, and then a next strongest collider from among the remaining colliders can then be selected, named as $p_{M+1}$. Then a similar equation as above can be generated for each of the other remaining colliders:

$$\begin{bmatrix} h_{k,p_{M+1}}^{M+1} \\ h_{k,i}^{M+1} \end{bmatrix}_{2 \times 1} = \begin{bmatrix} 1 & \frac{1}{L} \sum_j s_{k,p_M}^*(j) s_{k,i}(j) \\ \frac{1}{L} \sum_j s_{k,i}^*(j) s_{k,p_M}(j) & 1 \end{bmatrix}_{2 \times 2}^{-1} \times \begin{bmatrix} y_{k,p_M}^{M+1} \\ y_{k,i}^{M+1} \end{bmatrix}_{2 \times 1}. \quad \text{eqn. 3}$$

The connection of iteration M and iteration M+1 is the following equation, in which the correction metric vector, or correlation metric vector y is replaced by the intermediate (or estimated virtual channel) channel transfer estimation results of the 2×2 joint channel estimation in the previous iteration:

$$\begin{bmatrix} y_{k,p_{M+1}}^{M+1} \\ y_{k,i}^{M+1} \end{bmatrix}_{2 \times 1} = \begin{bmatrix} h_{k,p_{M+1}}^M \\ h_{k,i}^M \end{bmatrix}_{2 \times 1}. \quad \text{eqn. 4}$$

Although the equations above provide examples of the S-JCE with respect to an OFDM receiver, for example, for the sake of discussion, any receiver device can operate to utilize the disclosed embodiments, in which this disclosure is not limited to any one particular receiver type or variations in receiver operations. For CDMA, for example, the channel transfer function can be utilized as a channel impulse response (CIR) because the 2*2 matrix joint channel estimation and cancellation for CDMA could be done in the time domain, while for OFDM in frequency domain. The major difference between time domain and frequency domain is that: in time domain the channel fading profile can be the Channel Impulse Response (CIR) which correlates the pilots from the receiver point of view. In the frequency domain, the channel fading profile can be the Channel Transfer Function (CTF) which multiplies the pilots from the receiver point of view.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
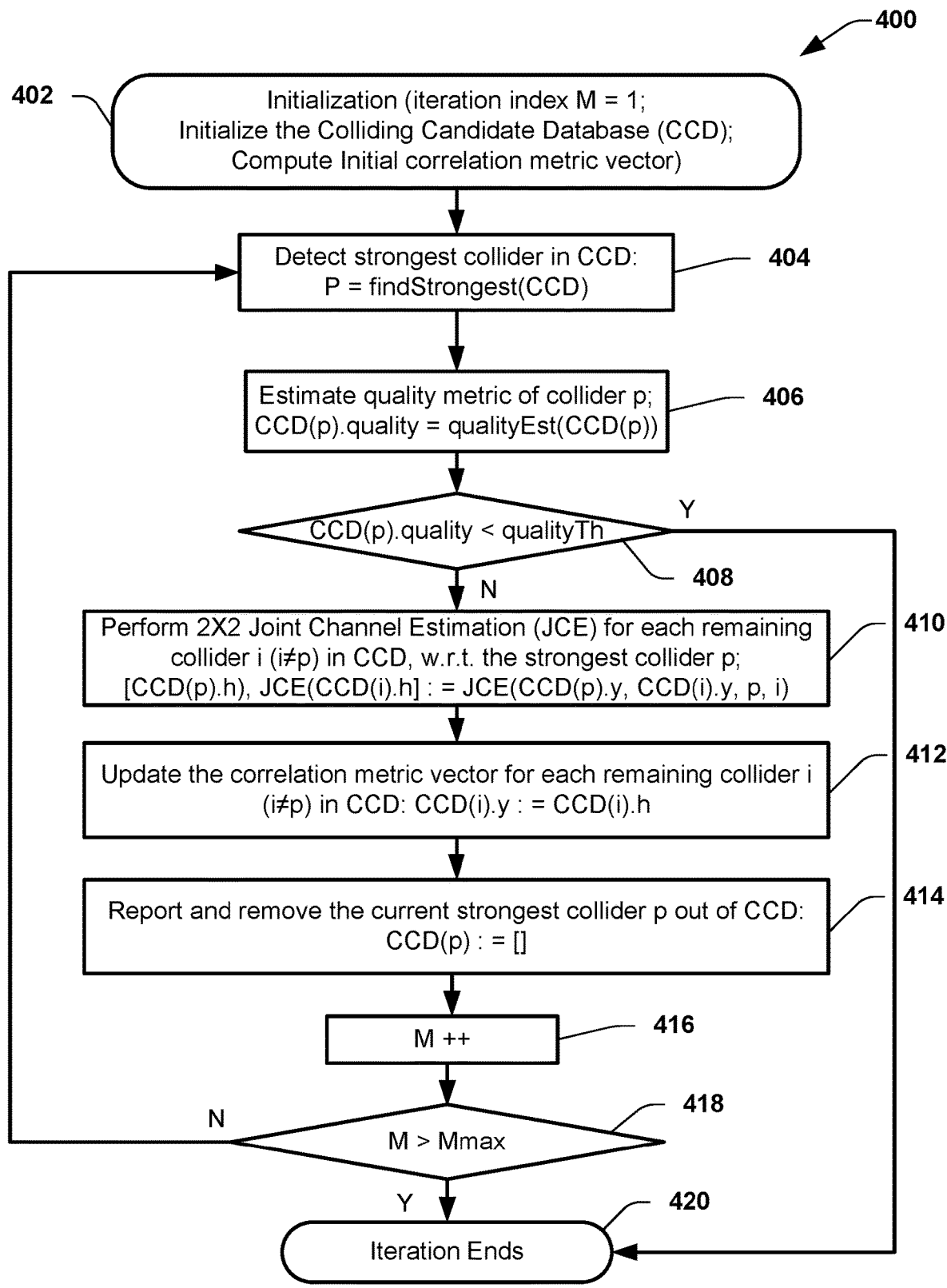
FIG. 4 illustrates a process flow for a-priori successive 2×2 joint channel estimation for collider interference according to various aspects or embodiments being disclosed.
Figure 5:
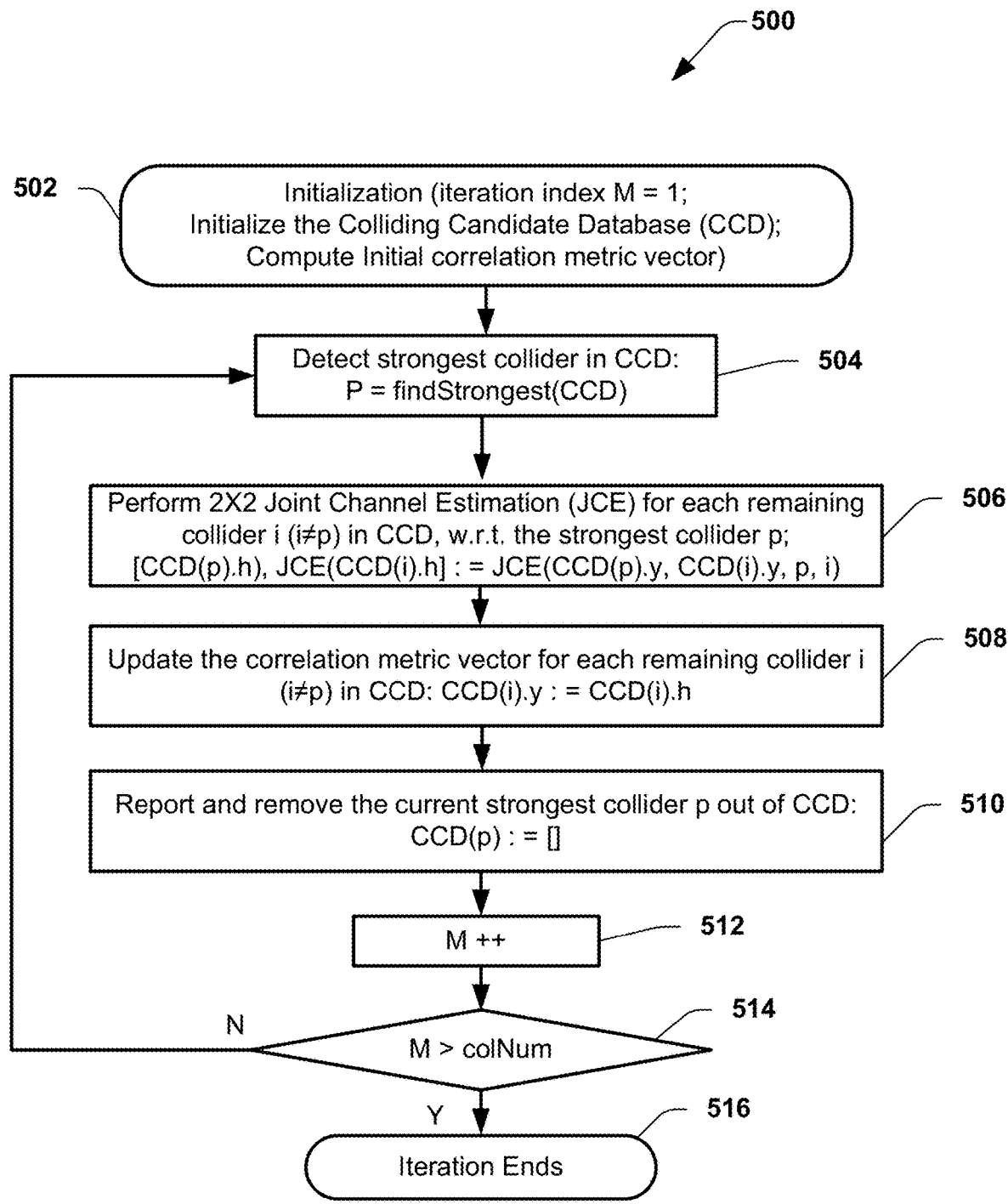
FIG. 5 illustrates another process flow for priori successive 2×2 joint channel estimation for collider interference according to various aspects or embodiments being disclosed.

Referring now to FIGS. 4 and 5, illustrated are example process flows 400 and 500, respectively demonstrated processes for S-JCE as with and without prior knowledge of colliders according to various aspects or embodiments herein.

FIG. 4 illustrates an example of colliding interference cancellation without priori-knowledge of colliders. This can happen primarily during an initial detection phase via the detection phase component 310 at the receiver circuitry such as for an OFDM receiver, CDMA receiver, or other receiver. Example processes that this portion of the processes can be as part of can be SSS based cell ID detection for LTE downlink and SSSS based side link detection for D2D. For this kind of application, a detection process that is without interference cancellation can be applied when a stronger collider is interfered with by weaker colliders. As such, it is only important to cancel the stronger colliders from the weaker collider, and not necessarily the other way around.

Initial detection processes can thus be integrated with the S-JCE processes as one embodiment demonstrated by the process flow 400 of FIG. 4, for example. At 402, parameters can be computed (e.g., via parameter component 304) such as one or more iteration index numbers (initializing iteration index M=1), a collider candidate database ((CCD), where a colliding candidate is a potential existing collider that may or may not exist), the initial correlation metric vector (which can correlate the input samples 245 with each descrambling sequence candidate, as well as other parameters (e.g., a peak amplitude, a sequence or bandwidth length, number of divided sub-bands/sub-carriers for the frequency band/carrier, signal to noise ratio or other receive signal parameters).

At 404, a collider (e.g., the strongest collider or other collider) within the CCD (e.g., data set 326) can be detected (e.g., via parameter component 304). The detection can be based on any number of detection algorithms or processes without any interference cancellation tricks because it can be sufficient to only detect the strongest collider. For example, detection processes can include SSS based cell ID detection for LTE downlink, SSS based side link detection for D2D can be utilized, or other collider detection operations.

At 406, quality estimation can be applied on the detected strongest collider (e.g., via the quality estimation component 306). The quality metric and estimation process can be a measure of a signal metric or property, for example, such as a signal noise interference ratio (SINR), a peak amplitude, or other parameter/property for example of the detected colliders.

At 408, the estimated quality metric can be checked as to whether it satisfies a pre-defined quality threshold, such as whether the quality metric is below or lower than a predetermined threshold. If yes, then it means the strongest detected collider candidate is actually not existing or too weak to be considered, then the iterations can stop, and the flow goes to act 420 and the iterations are termination (e.g., via termination component 318). Alternatively, if the threshold is not satisfied, and, for example, the collider is above a signal threshold then the flow continues to 410.

At 410, a 2×2 joint channel estimation can be applied (e.g., via 2×2 SJCE component 314) with each remaining collider candidate with respect to the detected strongest collider or other candidate, which can be selected via the selection component 310. Each of the iterations can comprise a sub-set of iterations, in which each collider of a plurality of colliders is correlated in the S-JCE at the sub-band. A first sub-set iteration can comprise the successive 2×2 matrix joint channel estimation (S-JCE) with the initial correlation metric vector between the first collider and another collider. The second sub-set iteration of the first iteration can comprise another successive 2×2 matrix joint channel estimation (S-JCE) with the initial correlation metric vector between the first collider and different other collider of remaining colliders. The sub-sets can continue until the selected collider (e.g., strongest collider or next strongest colliders) are processed accordingly with all colliders in a 2×2 successive matrix with the initial correlation metric vector and the first collider. In a different iteration, the previous strongest collider can be removed from the processing, another collider selected (e.g., a next strongest collider) and a 2×2 joint channel estimation can be applied (e.g., via 2×2 SJCE component 314) with each remaining collider candidate and an updated correlation metric or intermediate channel transfer functions.

The intermediate channel transfer function of each remaining collider can also be computed (e.g., via correlation metric component 316). At 412, the correlation metric vector can be generated (e.g., via correlation metric component 316) for each remaining collider and replaced by the computed intermediate channel transfer function on each sub-carrier/sub-band or each sub-carrier/sub-band group.

At 414, the current detected strongest collider can be reported and then removed from the CCD. At 416, the iteration index can be increased or incremented.

At 418, a determination can be made as to whether the iteration number is exceeding a pre-defined maximal number of iterations. If "yes" the iterations can stop at 420, and if "no" the process continues at 404. The iterations can continue with each sub-band or sub-carrier until the entire frequency band or carrier has been canceled with interference at the receiver.

FIG. 5 illustrates an example of colliding interference cancellation with priori-knowledge of the colliders. This process can happen primarily in a receiver demodulation phase, before which, the collider information has already been obtained by the detection phase via the detection phase component 310, for example. Typical examples can be RS based channel estimation and equalization. For this kind of application, process could be only interested to cancel the interferences out of only one collider (for example the serving cell). However, it is important to cancel all kind of colliders out of cell, regardless if they are weaker or stronger, in order to achieve the maximal throughput performance where the collider information is already known before S-JCE, and there is only one collider which is interested to be interference free (for example, the serving cell for demodulation).

The process flow 500 can be similar to FIG. 4, but abbreviated. However, some differences exist. At 502, the process flow 500 is similar to act 402, but the collider candidate database (CCD) (e.g., data set 326) can be configured to be a collider database (CD). CD can have a smaller size comparing with CCD because it contains the colliders which are truly physically existing and have been found by detection phase component 310 or pre-configured already. Because of that, there is no need of quality estimation and checking for the selected colliders in each of the iterations. The detection of the strongest collider can also be disabled or not utilized if the detection phase already reports the sorted strength. The maximal iteration number can be fixed to be the size number of CD. However, it can also be shortened, as a scalable tradeoff between computation time and interference cancellation performance, such as by early termination or otherwise via the termination component 318.

In another aspect, during the iterations, the collider of interest (indexed by d) is never selected as the interfering collider so it always remains in the CD during iteration as a fixed collider. As such, acts 506 to 516 can be otherwise similar processes as 410 to 420 of FIG. 4, and not repeated here for the sake of brevity.

Figure 6:
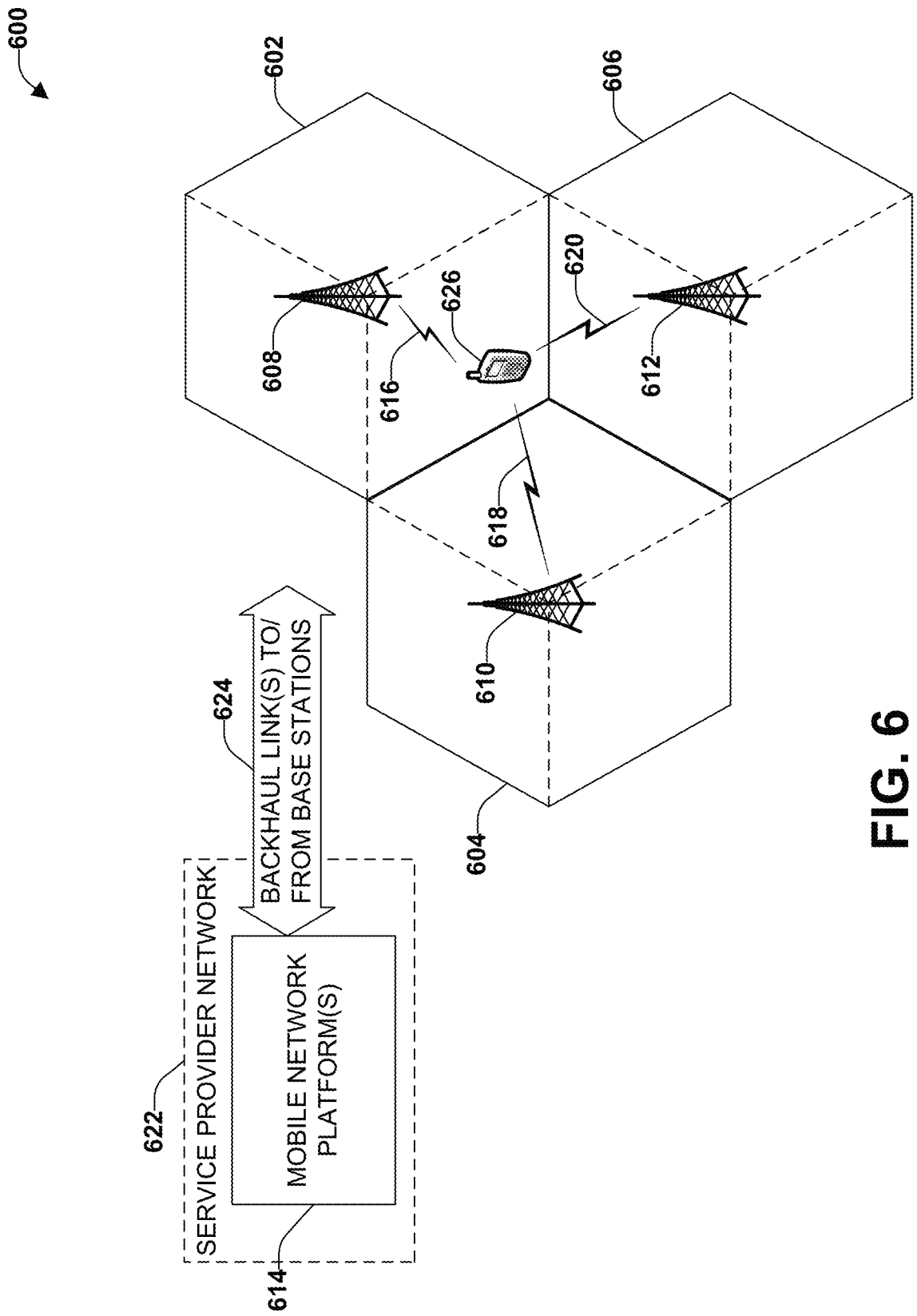
FIG. 6 is a schematic example of a wireless environment that can operate in accordance with aspects disclosed.

By way of further description with respect to one or more non-limiting environments to facilitate S-JCE interference cancellation, FIG. 6 is a schematic example wireless environment 600 that can operate in accordance with aspects described herein. In particular, example wireless environment 600 illustrates a set of wireless network macro cells. Three coverage macro cells 602, 604, and 606 include the illustrative wireless environment; however, it is noted that wireless cellular network deployments can encompass any number of macro cells. Coverage macro cells 602, 604, and 606 are illustrated as hexagons; however, coverage cells can adopt other geometries generally dictated by a deployment configuration or floor plan, geographic areas to be covered, and so on. Each macro cell 602, 604, and 606 is sectorized in a 2π/3 configuration in which each macro cell includes three sectors, demarcated with dashed lines in FIG. 6. It is noted that other sectorizations are possible, and aspects or features of the disclosed subject matter can be exploited regardless of type of sectorization. Macro cells 602, 604, and 606 are served respectively through base stations or eNodeBs 608, 610, and 612. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 614, and set of base stations (e.g., eNode B 608, 610, and 612) that serve a set of macro cells; electronic circuitry or components associated with the base stations in the set of base stations; a set of respective wireless links (e.g., links 616, 618, and 620) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 616, 618, and 620 embody a Uu interface (universal mobile telecommunication system Air Interface).

Mobile network platform(s) 614 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 622 (e.g., personal communication services, advanced wireless services, general wireless communications service, and so forth), and any unlicensed frequency bands currently available for telecommunication (e.g., mmW, the 2.4 GHz industrial, medical and scientific band or one or more of the 5 GHz set of bands, or otherwise). In addition, mobile network platform(s) 614 can control and manage base stations 608, 610, and 612 and radio component(s) associated thereof, in disparate macro cells 602, 604, and 606 by way of, for example, a wireless network management component (e.g., radio network controller(s), cellular gateway node(s), phased arrays, etc.). Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, mobile network platform 614 can be embodied in the service provider network 622.

In addition, wireless backhaul link(s) 624 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 624 embodies IuB interface.

It is noted that while exemplary wireless environment 600 is illustrated for macro cells and macro base stations, aspects, features and advantages of the disclosed subject matter can be implemented in micro cells, pico cells, femto cells, or the like, wherein base stations are embodied in home-based equipment related to access to a network (e.g., with one or more phased arrays or the like).

Figure 7:
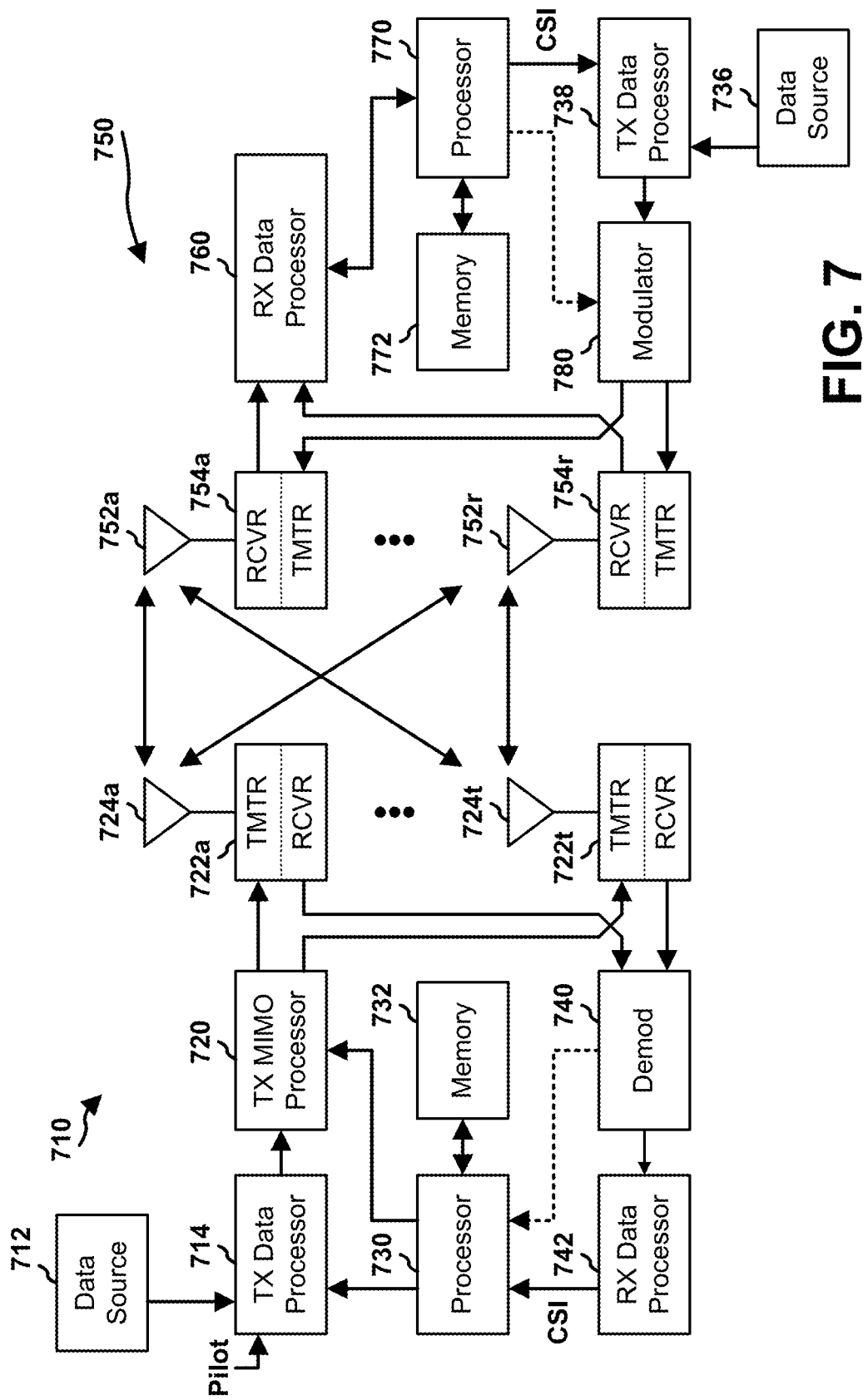
FIG. 7 is an illustration of an example wireless network platform to implement various aspects disclosed

FIG. 7 illustrates one example of a wireless communication system 700 that could also implement the components and aspects of a phased array as described above. The wireless communication system 700 depicts one base station 710 and one access terminal 750 for sake of brevity. However, it is to be appreciated that system 700 can include more than one base station and/or more than one access terminal, wherein additional base stations and/or access terminals can be substantially similar or different from example base station 710 and access terminal 750 described below. In addition, it is to be appreciated that base station 710 and/or access terminal 750 can employ the systems and/or methods described herein to facilitate wireless communication there between.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At access terminal 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

A processor 770 can periodically determine which available technology to utilize as discussed above. Further, processor 770 can formulate a reverse link message comprising a matrix index portion and a rank value portion.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from access terminal 750 are received by antennas 724, conditioned by receivers 722, demodulated by a demodulator 740, and processed by a RX data processor 760 to extract the reverse link message transmitted by access terminal 750. Further, processor 730 can process the extracted message to determine which precoding matrix to use for determining the beamforming weights.

Processors 730 and 770 can direct (e.g., control, coordinate, manage, etc.) operation at base station 710 and access terminal 750, respectively. Respective processors 730 and 770 can be associated with memory 732 and 772 that store program codes and data. Processors 730 and 770 can also perform computations to derive frequency and impulse response estimates for the uplink and downlink, respectively.

Embodiments of the technology herein may be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a computer-readable media comprising executable instructions that, in response to execution, cause a receiver of an evolved NodeB (eNB), or a user equipment (UE), comprising one or more processors to perform operations, the operations comprising: determining, via the one or more processors of the receiver, a strongest collider of a plurality of N colliders from among pilot signals of a sub-band, wherein N is an integer greater than two; performing a 2 by 2 matrix joint channel estimation with a property of the strongest collider and other colliders of the plurality of N colliders, at a first iteration of a plurality of iterations; generating an updated correlation metric vector based on the 2 by 2 matrix joint channel estimation at the first iteration by excluding a contribution of the strongest collider from the plurality of N colliders; and performing another 2 by 2 matrix joint channel estimation with the updated correlation metric vector between a next strongest collider of the plurality of N colliders and remaining colliders of the plurality of N colliders at a second iteration of the plurality of iterations.

Example 2 includes the subject matter of Example 1, including or omitting optional elements, wherein the determining of the strongest collider further comprises selecting one of the plurality of N colliders in a data storage based on a rank of a signal strength.

Example 3 includes the subject matter of any one of Examples 1-2, including or omitting optional elements, wherein one collider comprises a fixed collider that is not excluded from the plurality of colliders of a collider data storage and is made to be interference free.

Example 4 includes the subject matter of any one of Examples 1-3, including or omitting optional elements, wherein the operations further comprise: determining one or more parameters of one or more input samples of the pilot signals on the sub-band, wherein the one or more parameters comprise an iteration index number, a collider dataset with colliders, and an initial correlation metric vector that correlates the one or more input samples with one or more descrambling sequence candidates.

Example 5 includes the subject matter of any one of Examples 1-4, including or omitting optional elements, wherein the operations further comprise: selecting the strongest collider from a collider data storage based on a ranking of the plurality of colliders.

Example 6 includes the subject matter of any one of Examples 1-5, including or omitting optional elements, wherein the operations further comprise: generating the updated correlation metric vector based on a result of the 2 by 2 matrix joint channel estimation by generating a channel transfer function of an indexed collider of the plurality of N colliders with at least one other channel transfer function of the remaining colliders of the plurality of N colliders that have been descrambled by a local descrambling sequence.

Example 7 includes the subject matter of any one of Examples 1-6, including or omitting optional elements, wherein the operations further comprise: removing the strongest collider from the plurality of N colliders after a completion of the first iteration of the plurality of iterations; and performing the 2 by 2 matrix joint channel estimation between the strongest collider and the other colliders at the sub-sub-band of a frequency band at a sub-set of iterations at the first iteration and at the second iteration of the plurality of iterations.

Example 8 includes the subject matter of any one of Examples 1-7, including or omitting optional elements, wherein the plurality of N colliders comprises pseudo-noise (PN) sequence based signals comprising one or more of secondary synchronization signals (SSS) associated with a LTE downlink cell ID detection, side link secondary synchronization signals (SSSS) associated with a side link ID detection in a device-to-device (D2D) communication, or reference signals (RS) associated with a LTE downlink reference signal received power (RSRP) measurement or demodulation.

Example 9 is a computer-readable media comprising executable instructions that, in response to execution, cause a receiver of an evolved NodeB (eNB), or a user equipment (UE), comprising one or more processors to perform operations. The operations comprise: performing, via the one or more processors of the receiver, a successive joint channel estimation that cancels interference of colliders at the receiver without prior knowledge related to the colliders comprising: generating a collider candidate set of candidate colliders based on a detection of one or more pseudo-noise (PN) sequences at one or more receiver inputs; generating a correlation metric vector by correlating one or more input sequences at the one or more receiver inputs with one or more descrambling sequence candidates derived from a descrambling operation of the candidate colliders; selecting a candidate collider from the collider candidate set and whether the candidate collider satisfies a predetermined quality threshold; and generating, at a plurality of iterations, a 2 by 2 matrix joint channel estimation with the candidate collider and other interference colliders of the collider candidate set based on the correlation metric vector.

Example 10 includes the subject matter of Example 9, including or omitting optional elements, wherein the generating the 2 by 2 matrix joint channel estimation with the candidate collider and the other interference colliders of the collider candidate set comprises: generating a first subset of iterations corresponding to sub-bands of a frequency band, at a first iteration of the plurality of iterations; generating an updated correlation metric vector based on the 2 by 2 matrix joint channel estimation at the first iteration by excluding a contribution of the candidate collider from the collider candidate set; and performing another 2 by 2 matrix joint channel estimation with the updated correlation metric vector between a next candidate collider of the collider candidate set and remaining interference colliders, in a second subset of iterations corresponding to the sub-bands of the frequency band, at a second iteration of the plurality of iterations.

Example 11 includes the subject matter of any one of Examples 9-10, including or omitting optional elements, wherein the operations further comprise: terminating the plurality of iterations, based on a predefined number of iterations, or, in response to a quality estimation of a strongest collider of the collider candidate set satisfying the predetermined quality threshold.

Example 12 includes the subject matter of any one of Examples 9-11, including or omitting optional elements, wherein the plurality of iterations comprise further updating the collider candidate set by excluding a previous candidate collider and selecting another candidate collider from the updated collider candidate set, and further updating the correlation metric vector.

Example 13 includes the subject matter of any one of Examples 9-12, including or omitting optional elements, wherein the operations further comprise: generating an updated correlation metric vector based on the 2 by 2 matrix joint channel estimation by excluding a contribution of the collider from the collider candidate set, wherein the collider candidate set comprises more than two candidate colliders; and performing another 2 by 2 matrix joint channel estimation with the updated correlation metric vector between a next candidate collider of the collider candidate set and remaining interference colliders of the collider candidate set.

Example 14 is an apparatus of a network device comprising: a memory that stores computer-executable components; and one or more processors of a receiver chain, communicatively coupled to the memory, that facilitates execution of the computer-executable components, the computer-executable components comprising: a selection component configured to select a first collider of a plurality of colliders; a 2 by 2 matrix joint channel estimation component configured to perform, in a first subset of iterations, a successive 2 by 2 matrix joint channel estimation with an initial correlation metric vector between the first collider of the plurality of colliders and other colliders of the plurality of colliders, in a first iteration of a set of iterations; and a correlation metric component configured to generate an updated correlation metric vector based on the 2 by 2 matrix joint channel estimation at the first iteration by excluding a contribution of the first collider from the plurality of colliders; wherein the 2 by 2 matrix joint channel estimation component is further configured to perform, in a second subset of iterations, another 2 by 2 matrix joint channel estimation with the updated correlation metric vector between a second collider and remaining colliders of the plurality of colliders, respectively, at a second iteration of the set of iterations.

Example 15 includes the subject matter of Example 14, including or omitting optional elements, further comprising: a parameter component configured to determine one or more parameters of one or more input samples from pilot signals on a same sub-band, wherein the one or more parameters comprises at least one of an iteration index number, a collider candidate dataset with potential colliders, or an initial correlation metric vector that correlates the one or more input samples with one or more descrambling sequence candidates.

Example 16 includes the subject matter of any one of Examples 14-15, including or omitting optional elements, wherein the selection component is further configured to select a potential collider from a plurality of potential colliders in a collider candidate set of the memory based on a ranking of the plurality of potential colliders.

Example 17 includes the subject matter of any one of Examples 14-16, including or omitting optional elements, further comprising: a quality estimation component configured to perform a quality estimation to determine whether the potential collider satisfies a predetermined threshold.

Example 18 includes the subject matter of any one of Examples 14-17, including or omitting optional elements, wherein the a correlation metric component is further configured to generate the updated correlation metric vector based on the 2 by 2 matrix joint channel estimation by generating an intermediate channel transfer function that comprises a channel transfer function of an indexed collider of the plurality of colliders and another channel transfer function of the remaining colliders of the plurality of colliders that have been descrambled by a local descrambling sequence.

Example 19 includes the subject matter of any one of Examples 14-18, including or omitting optional elements, further comprising: an elimination component configured to remove a contribution of the potential collider from the plurality of colliders after a completion of one or more iterations of the set of iterations, wherein the potential collider comprises a strongest collider among the plurality of colliders.

Example 20 includes the subject matter of any one of Examples 14-19, including or omitting optional elements, wherein the 2 by 2 matrix joint channel estimation component is further configured to perform the 2 by 2 matrix joint channel estimation between the potential collider and the other colliders of the plurality of colliders at each sub-band of a frequency band corresponding to different sets of iterations.

Example 21 includes the subject matter of any one of Examples 14-20, including or omitting optional elements, wherein the plurality of colliders comprises pseudo-noise (PN) sequence based signals comprising one or more of a secondary synchronization signal (SSS), a side link secondary synchronization signal (SSSS), or a reference signal (RS).

Example 22 includes the subject matter of any one of Examples 14-21, including or omitting optional elements, wherein the network device comprises a user equipment (UE), or an evolved NodeB (eNB), comprising one or more antenna ports coupled to the receiver chain, and one or more transmitter chains coupled to the one or more antenna ports.

Example 23 includes the subject matter of any one of Examples 14-22, including or omitting optional elements, further comprising: a detection component configured to generate a collider candidate set of candidate colliders based on a detection of pseudo-noise (PN) sequences at one or more receiver inputs.

Example 24 includes the subject matter of any one of Examples 14-23, including or omitting optional elements, wherein the correlation metric component is further configured to generate an initial correlation metric vector by correlating one or more input sequences at the one or more receiver inputs with one or more descrambling sequence candidates derived from a descrambling operation of the candidate colliders.

Example 25 includes the subject matter of any one of Examples 14-24, including or omitting optional elements, further comprising: a termination component configured to terminate the plurality of iterations, based on a predefined number of iterations, or, in response to a quality estimation of a strongest collider of the plurality of colliders satisfying the predetermined quality threshold.

Example 26 is a system comprising: a means for determining a strongest collider of a plurality of N colliders from among pilot signals of a sub-band, wherein N is an integer greater than two; a means for performing a 2 by 2 matrix joint channel estimation with a property of the strongest collider and other colliders of the plurality of N colliders, at a first iteration of a plurality of iterations; a means for generating an updated correlation metric vector based on the 2 by 2 matrix joint channel estimation at the first iteration by excluding a contribution of the strongest collider from the plurality of N colliders; and a means for performing another 2 by 2 matrix joint channel estimation with the updated correlation metric vector between a next strongest collider of the plurality of N colliders and remaining colliders of the plurality of N colliders at a second iteration of the plurality of iterations.

Example 27 includes the subject matter of Example 26, wherein the means for determining the strongest collider further comprises a means for selecting one of the plurality of N colliders in a data storage based on a rank of a signal strength.

Example 28 includes the subject matter of any one of Examples 26-27, including or omitting optional elements, a means for generating a channel transfer function of an indexed collider of the plurality of N colliders with at least one other channel transfer function of the remaining colliders of the plurality of N colliders that have been descrambled by a local descrambling sequence.

Example 29 includes the subject matter of any one of Examples 26-28, including or omitting optional elements, further comprising: a means for removing the strongest collider from the plurality of N colliders after a completion of the first iteration of the plurality of iterations; and a means for performing the 2 by 2 matrix joint channel estimation between the strongest collider and the other colliders at the sub-sub-band of a frequency band at a sub-set of iterations at the first iteration and at the second iteration of the plurality of iterations.

Example 30 is a system comprising: a means for performing, via the one or more processors of the receiver, a successive joint channel estimation that cancels interference of colliders at the receiver without prior knowledge related to the colliders comprising: a means for generating a collider candidate set of candidate colliders based on a detection of one or more pseudo-noise (PN) sequences at one or more receiver inputs; a means for generating a correlation metric vector by correlating one or more input sequences at the one or more receiver inputs with one or more descrambling sequence candidates derived from a descrambling operation of the candidate colliders; a means for selecting a candidate collider from the collider candidate set and whether the candidate collider satisfies a predetermined quality threshold; and a means for generating, at a plurality of iterations, a 2 by 2 matrix joint channel estimation with the candidate collider and other interference colliders of the collider candidate set based on the correlation metric vector.

Example 31 includes the subject matter of Example 30, including or omitting optional elements, wherein the means for generating the 2 by 2 matrix joint channel estimation with the candidate collider and the other interference colliders of the collider candidate set comprises: a means for generating a first subset of iterations corresponding to sub-bands of a frequency band, at a first iteration of the plurality of iterations; a means for generating an updated correlation metric vector based on the 2 by 2 matrix joint channel estimation at the first iteration by excluding a contribution of the candidate collider from the collider candidate set; and a means for performing another 2 by 2 matrix joint channel estimation with the updated correlation metric vector between a next candidate collider of the collider candidate set and remaining interference colliders, in a second subset of iterations corresponding to the sub-bands of the frequency band, at a second iteration of the plurality of iterations.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A non-transitory computer-readable media comprising executable instructions that, in response to execution, cause a receiver of an evolved NodeB (eNB), or a user equipment (UE), comprising one or more processors to perform operations, the operations comprising:
    determining, via the one or more processors of the receiver, a strongest collider of a plurality of N colliders from among pilot signals of a sub-band, wherein N is an integer greater than two;
    performing a 2 by 2 matrix joint channel with a property of the strongest collider and other colliders of the plurality of N colliders, at a first iteration of a plurality of iterations, wherein the strongest collider is above a predetermined quality threshold;
    generating an updated correlation metric vector based on the 2 by 2 matrix joint channel estimation at the first iteration by excluding a contribution of the strongest collider from the plurality of N colliders;
    performing another 2 by 2 matrix joint channel estimation with the updated correlation metric vector between a next strongest collider of the plurality of N colliders and remaining colliders of the plurality of N colliders at a second iteration of the plurality of iterations; and
    terminating the plurality of iterations in response to a quality estimation of a remaining strongest collider of the plurality of N colliders being below the predetermined quality threshold.

2. The non-transitory computer-readable media of claim 1, wherein the determining of the strongest collider further comprises selecting one of the plurality of N colliders in a data storage based on a rank of a signal strength.

3. The non-transitory computer-readable media of claim 1, wherein one collider comprises a fixed collider that is not excluded from the plurality of colliders of a collider data storage and is made to be interference free.

4. The non-transitory computer-readable media of claim 1, wherein the operations further comprise: determining one or more parameters of one or more input samples of the pilot signals on the sub-band, wherein the one or more parameters comprise an iteration index number, a collider dataset with colliders, and an initial correlation metric vector that correlates the one or more input samples with one or more descrambling sequence candidates.

5. The non-transitory computer-readable media of claim 1, wherein the operations further comprise: selecting the strongest collider from a collider data storage based on a ranking of the plurality of colliders.

6. The non-transitory computer-readable media of claim 1, wherein the operations further comprise: generating the updated correlation metric vector based on a result of the 2 by 2 matrix joint channel estimation by generating a channel transfer function of an indexed collider of the plurality of N colliders with at least one other channel transfer function of the remaining colliders of the plurality of N colliders that have been descrambled by a local descrambling sequence.

7. The non-transitory computer-readable media of claim 4, wherein the operations further comprise: removing the strongest collider from the plurality of N colliders after a completion of the first iteration of the plurality of iterations; and performing the 2 by 2 matrix joint channel estimation between the strongest collider and the other colliders at the sub-band of a frequency band at a sub-set of iterations at the first iteration and at the second iteration of the plurality of iterations.

8. The non-transitory computer-readable media of claim 1, wherein the plurality of N colliders comprises pseudo-noise (PN) sequence based signals comprising one or more of secondary synchronization signals (SSS) associated with a LTE downlink cell ID detection, side link secondary synchronization signals (SSSS) associated with a side link ID detection in a device-to-device (D2D) communication, or reference signals (RS) associated with a LTE downlink reference signal received power (RSRP) measurement or demodulation.

9. A non-transitory computer-readable media comprising executable instructions that, in response to execution, cause a receiver of an evolved NodeB (eNB), or a user equipment (UE), comprising one or more processors to perform operations, the operations comprising:
    performing, via the one or more processors of the receiver, a successive joint channel estimation that cancels interference of colliders at the receiver without prior knowledge related to the colliders comprising:

generating a collider candidate set of candidate colliders based on a detection of one or more pseudo-noise (PN) sequences at one or more receiver inputs;

generating a correlation metric vector by correlating one or more input sequences at the one or more receiver inputs with one or more descrambling sequence candidates derived from a descrambling operation of the candidate colliders;

selecting a candidate collider from the collider candidate set based on the candidate collider satisfying a predetermined quality threshold as a strongest collider;

generating, at a plurality of iterations, a 2 by 2 matrix joint channel estimation with the candidate collider and other interference colliders of the collider candidate set based on the correlation metric vector; and terminating the plurality of iterations in response to a quality estimation of a remaining strongest collider of the collider candidate set being below the predetermined quality threshold.

10. The non-transitory computer-readable media of claim 9, wherein the generating the 2 by 2 matrix joint channel estimation with the candidate collider and the other interference colliders of the collider candidate set comprises: generating a first subset of iterations corresponding to sub-bands of a frequency band, at a first iteration of the plurality of iterations; generating an updated correlation metric vector based on the 2 by 2 matrix joint channel estimation at the first iteration by excluding a contribution of the candidate collider from the collider candidate set; and performing another 2 by 2 matrix joint channel estimation with the updated correlation metric vector between a next candidate collider of the collider candidate set and remaining interference colliders, in a second subset of iterations corresponding to the sub-bands of the frequency band, at a second iteration of the plurality of iterations.

11. The non-transitory computer-readable media of claim 9, wherein the operations further comprise: terminating the plurality of iterations, based on a predefined number of iterations.

12. The non-transitory computer-readable media of claim 9, wherein the plurality of iterations comprise further updating the collider candidate set by excluding a previous candidate collider and selecting another candidate collider from the updated collider candidate set, and further updating the correlation metric vector.

13. The non-transitory computer-readable media of claim 9, wherein the operations further comprise: generating an updated correlation metric vector based on the 2 by 2 matrix joint channel estimation by excluding a contribution of the collider from the collider candidate set, wherein the collider candidate set comprises more than two candidate colliders; and performing another 2 by 2 matrix joint channel estimation with the updated correlation metric vector between a next candidate collider of the collider candidate set and remaining interference colliders of the collider candidate set.

14. An apparatus of a network device comprising: a memory that stores computer-executable components; and one or more processors of a receiver chain, communicatively coupled to the memory, configured to: that facilitates execution of the computer-executable components, the computer-executable components comprising:

a selection component configured to select a first collider of a plurality of colliders;

a 2 by 2 matrix joint channel estimation component configured to perform, in a first subset of iterations, a successive 2 by 2 matrix joint channel estimation with an initial correlation metric vector between the first collider of the plurality of colliders and other colliders of the plurality of colliders, in a first iteration of a set of iterations, wherein the first collider satisfies a predetermined quality threshold as a strongest collider; and a correlation metric component configured to generate an updated correlation metric vector based on the 2 by 2 matrix joint channel estimation at the first iteration by excluding a contribution of the first collider from the plurality of colliders;

wherein the 2 by 2 matrix joint channel estimation component is further configured to perform, in a second subset of iterations, another 2 by 2 matrix joint channel estimation with the updated correlation metric vector between a second collider and remaining colliders of the plurality of colliders, respectively, at a second iteration of the set of iterations; and a termination component configured to terminate the set of iterations in response to a quality estimation of a remaining strongest collider of the plurality of colliders being below the predetermined quality threshold.

15. The apparatus of claim 14, further comprising: a parameter component configured to determine one or more parameters of one or more input samples from pilot signals on a same sub-band, wherein the one or more parameters comprises at least one of an iteration index number, a collider candidate dataset with potential colliders, or an initial correlation metric vector that correlates the one or more input samples with one or more descrambling sequence candidates.

16. The apparatus of claim 14, wherein the selection component is further configured to select a potential collider from a plurality of potential colliders in a collider candidate set of the memory based on a ranking of the plurality of potential colliders.

17. The apparatus of claim 16, further comprising: a quality estimation component configured to perform a quality estimation to determine whether the potential collider satisfies a predetermined threshold.

18. The apparatus of claim 16, wherein the a correlation metric component is further configured to generate the updated correlation metric vector based on the 2 by 2 matrix joint channel estimation by generating an intermediate channel transfer function that comprises a channel transfer function of an indexed collider of the plurality of colliders and another channel transfer function of the remaining colliders of the plurality of colliders that have been descrambled by a local descrambling sequence.

19. The apparatus of claim 16, further comprising: an elimination component configured to remove a contribution of the potential collider from the plurality of colliders after a completion of one or more iterations of the set of iterations, wherein the potential collider comprises the strongest collider among the plurality of colliders.

20. The apparatus of claim 16, wherein the 2 by 2 matrix joint channel estimation component is further configured to perform the 2 by 2 matrix joint channel estimation between the potential collider and the other colliders of the plurality of colliders at each sub-band of a frequency band corresponding to different sets of iterations.

21. The apparatus of claim 14, wherein the plurality of colliders comprises pseudo-noise (PN) sequence based signals comprising one or more of a secondary synchronization signal (SSS), a side link secondary synchronization signal (SSSS), or a reference signal (RS).

22. The apparatus of claim 14, wherein the network device comprises a user equipment (UE), or an evolved NodeB (eNB), comprising one or more antenna ports coupled to the receiver chain, and one or more transmitter chains coupled to the one or more antenna ports.

23. The apparatus of claim 14, further comprising: a detection component configured to generate a collider candidate set of candidate colliders based on a detection of pseudo-noise (PN) sequences at one or more receiver inputs.

24. The apparatus of claim 14, wherein the correlation metric component is further configured to generate an initial correlation metric vector by correlating one or more input sequences at the one or more receiver inputs with one or more descrambling sequence candidates derived from a descrambling operation of candidate colliders.

25. The apparatus of claim 14, wherein the termination component configured to terminate the set of iterations, based on a predefined number of iterations.

\* \* \* \* \*